R. G. McDOWELL.
DRILL SOCKET.
APPLICATION FILED APR. 30, 1912.
1,089,660.
Patented Mar. 10, 1914.
2 SHEETS—SHEET 2.
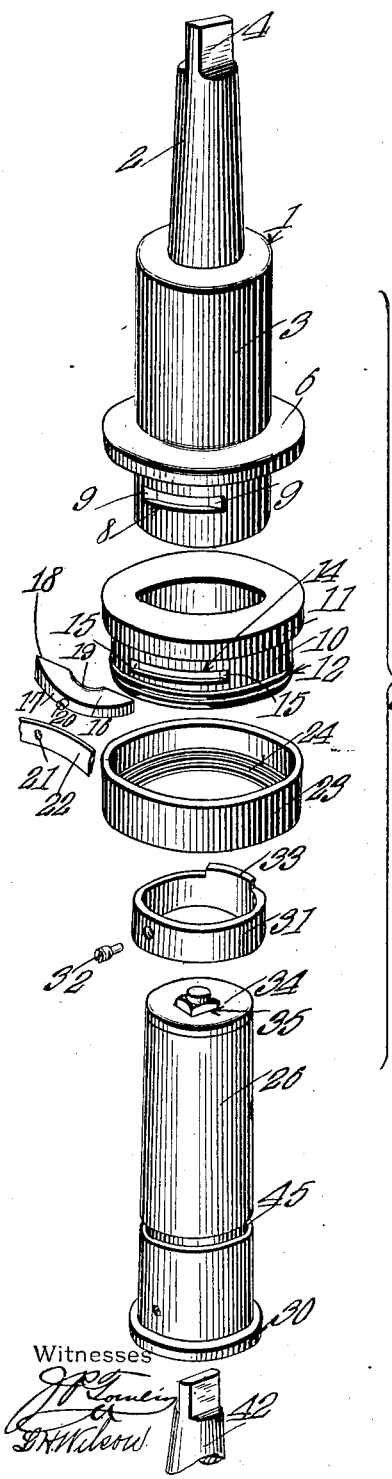
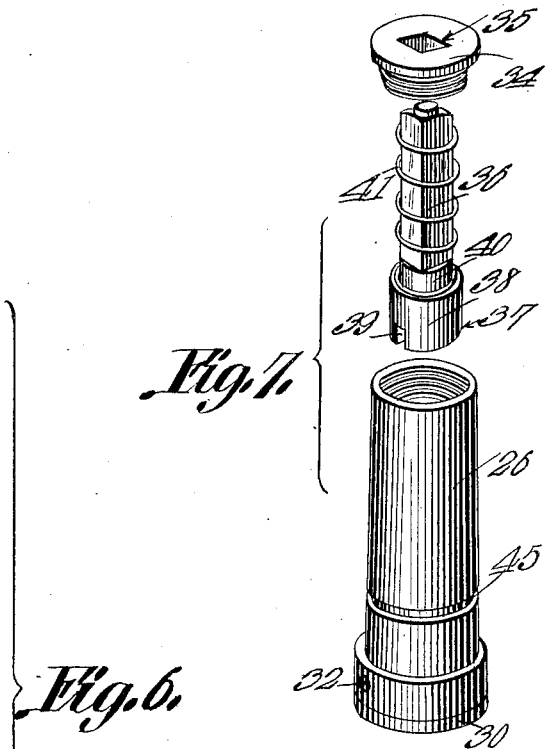
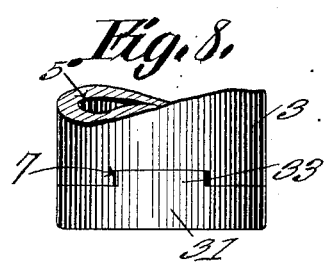
Robert G. McDowell,
Inventor
by C. A. Snow & Co.
Attorneys

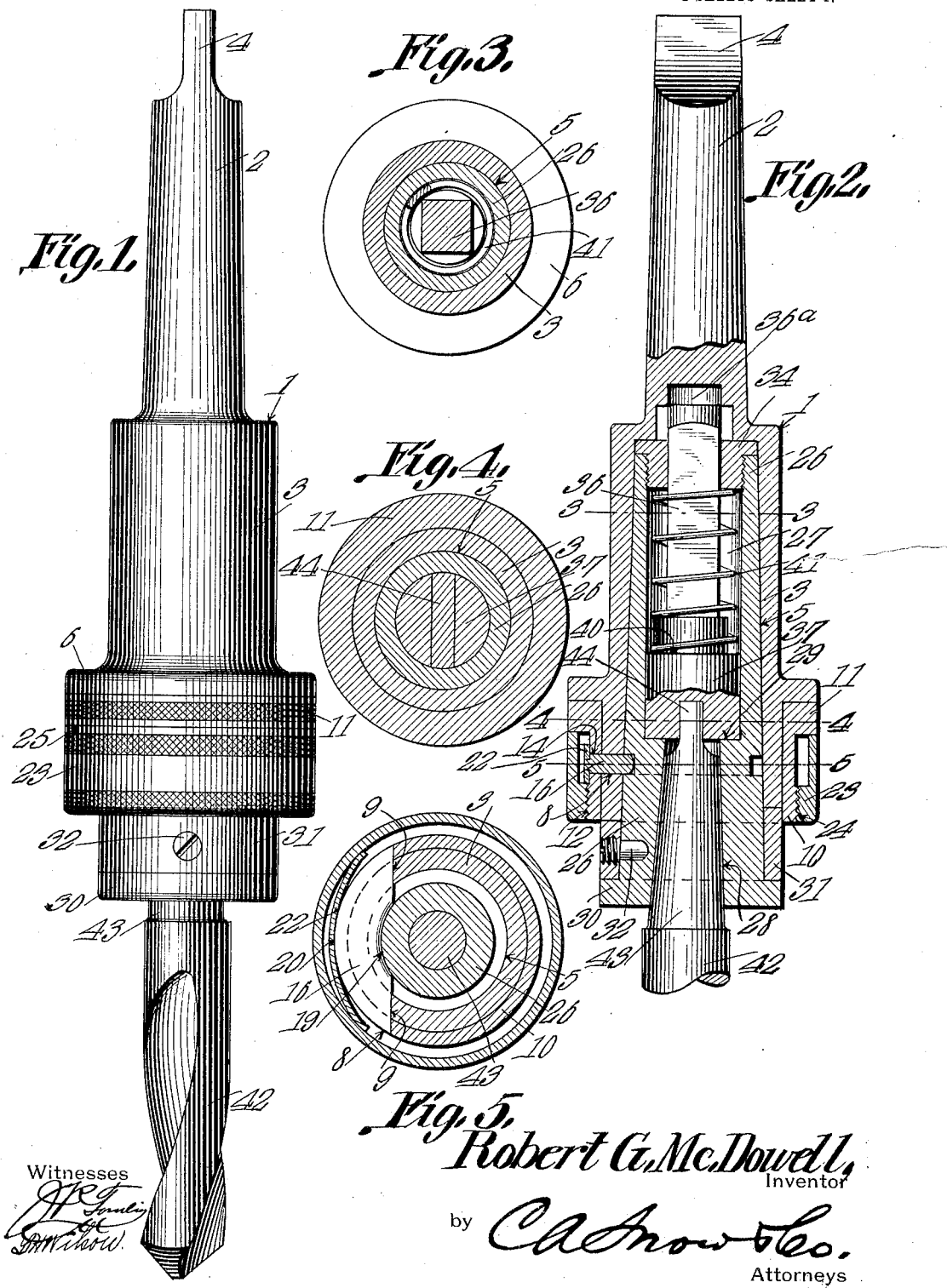

UNITED STATES PATENT OFFICE.

ROBERT G. McDOWELL, OF WALKERVILLE, MONTANA, ASSIGNOR OF ONE-FOURTH TO ROBERT B. McINTYRE, OF WALKERVILLE, MONTANA, AND ONE-FOURTH TO MARTIN F. GILLIGAN, OF BUTTE, MONTANA.

DRILL-SOCKET.

1,089,660.  Specification of Letters Patent.  Patented Mar. 10, 1914.

Application filed April 30, 1912. Serial No. 694,276.

*To all whom it may concern:*

Be it known that I, ROBERT G. MCDOWELL, a citizen of the United States, residing at Walkerville, in the county of Silverbow and State of Montana, have invented a new and useful Drill-Socket, of which the following is a specification.

One object of the present invention is to provide a device of the class above mentioned so constituted that the drill holder may be mounted in and removed from the power-driven chuck while the chuck is being rotated.

A further object of the invention is to provide a novel form of locking mechanism adapted to be operated manually while the chuck is in rotation, to relieve the drill-holding element.

The invention aims further to provide a novel form of mechanism whereby the drill-holding member will be released from the driving chuck, when the drill becomes bound, thereby obviating a twisting off of the drill.

Another object of the invention is to provide a device of this character which will accommodate drills the shanks of which are of different lengths.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings, Figure 1 shows the invention in side elevation; Fig. 2 is a longitudinal section wherein sundry parts appear in elevation; Fig. 3 is a transverse section upon the line 3—3 of Fig. 2; Fig. 4 is a transverse section upon the line 4—4 of Fig. 2; Fig. 5 is a transverse section on the line 5—5 of Fig. 2; Fig. 6 is a perspective showing the constituent elements of the structure in spaced relation; Fig. 7 is a perspective showing the parts of the drill-receiving and drill-holding members in spaced relation; and Fig. 8 is a fragmental side elevation of the chuck and the drill-receiving member, the view depicting the interlocking elements whereby rotatory movement is imparted from the chuck to the drill-receiving member.

For convenience in description, it will be presupposed that the device is mounted as shown in Figs. 1, 2 and 6 of the drawings, the terms "upper", "lower" and the like being employed accordingly.

In carrying out the invention there is provided a chuck which is denoted generally by the numeral 1. The chuck 1 includes a shank 2 and a tubular head 3. The shank 2 terminates at its upper end in a tang 4 whereby the chuck 1 may be operatively connected with a driving element. The head 3 of the chuck 1 is equipped with a tapered bore 5. The head 3 is supplied intermediate its upper and lower ends with a laterally projecting flange 6. In the lower end of the head 3 there is fashioned a recess 7. (Note particularly Fig. 8). The head 3 is provided below the flange 6 with a transverse slot 8, the end walls of which are denoted by the numeral 9.

The invention further includes a sleeve 10 journaled for rotation upon the head 3 below the flange 6 and provided with a flange 11 adapted to abut against the flange 6, the lower end of the sleeve 10 being externally threaded as indicated at 12. In the sleeve 10, between the threaded portion 12 and the flange 11 is fashioned a transverse slot 14, the end walls of which are denoted by the numeral 15. When the flange 11 of the sleeve 10 abuts against the flange 6 of the head 3 the slot 14 in the sleeve 10 will be alined, longitudinally of the device, with the slot 8 in the head 3, the end walls 15 of the slot 14 being alined with the end walls 9 of the slot 8.

Mounted slidably in the alined slots 14 and 8 is a detent 16. The outer edge 17 of the detent 16 is curved to follow the curvature of the sleeve 10. The inner edge 18 of the detent 16 is straight, saving for a beveled recess 19, and the width of the detent is such that when the outer edge 17 of the detent is alined approximately with the outer face of the sleeve 10, the inner edge 18 of the detent will be disposed within the bore 5 of the head 3. Projecting from the curved edge 17 of the detent 16 is a lug 20 received within an opening 21 fashioned in the intermediate portion of a bowed spring 22, the ends of the spring 22 being received by the inner face of a collar 23 threaded as shown at 24 to engage with the threaded portion 12 of the sleeve 10. The collar 23 is rotated into abutment with the flange 11 of the sleeve 10 so that the collar 23 and the sleeve 10 rotate as one piece upon the lower portion of the head 3. The line of abutment between the collar 23 and the flange 11 of the sleeve 10 is indicated by the reference character 25.

The invention further includes a tubular drill-receiving member 26 located within the bore 5 of the head 3, the drill-receiving member 26 being provided with an axial chamber 27 communicating with a tapered, drill-receiving bore 28, there being a shoulder 29 in the interior of the member 26 at the point where the chamber 27 merges into the bore 28.

At the lower end of the tubular drill-receiving member 26 is fashioned a lateral flange 30 which supports a ring 31 for rotation upon the member 26. Relative movement between the ring 31 and the tubular drill-receiving member 26, however, is normally prevented by means of a frangible element 32, preferably taking the form of a screw threaded through the ring 31 and entering the wall of the drill-receiving member 26, the screw 32 ordinarily being fashioned from brass or other like metal having but small shearing strength. The ring 31 is supplied with a projection 33 which engages in the recess 7 in the lower end of the head 3 of the chuck 1. Threaded into the upper end of the drill-receiving member 26 is a nut 34 having a polygonal axial opening 35.

The drill-holder is denoted generally by the numeral 37 and is located within the drill-receiving member 26. The drill-holder 37 includes a polygonal shank 36, held against rotation in the opening 35 of the nut 34 but adapted to rotate in a recess 36ª fashioned in the shank 2 of the chuck 1 and constituting a reduced continuation of the tapered bore 5. At its lower end, the drill-holder 37 terminates in a head 38 provided with a kerf 39. Located above the head 38 is a shoulder 40 which is of greater diameter than the polygonal shank 36 of the drill-holder and of less diameter than the head 38 of the drill-holder. A helical compression spring 41 surrounds the shoulder 40 and the polygonal shank 36, one end of the spring 41 abutting against the head 38 and the other end of the spring abutting against the lower end of the nut 34. The shoulder 40 serves to hold the spring 41 against transverse movement and to space the spring apart slightly from the shank 36, so that the spring may be compressed and may expand readily. The drill which is driven by the chuck 1 is denoted by the numeral 42 and is shown as comprising a shank 43 and a tang 44.

In practical operation, the shank 43 of the drill 42 is inserted into the tapered, drill-receiving bore 28 of the member 26, the tang 44 of the drill 42 entering the kerf 39 which is fashioned in the head 38 of the drill-holder 37. During this operation, the shank 36 of the drill-holder 37 may slide in the opening 35 of the nut 34, if the shank 43 of the drill 42 is sufficiently long to produce this operation, the head 38 of the drill-holder 37 being lifted off the shoulder 29 and the spring 41 being put under tension. It may be observed at this point that the spring 41 serves to hold the head 38 engaged with the tang 44 of the drill.

The drill 42 in the foregoing operation will be assembled with the tubular drill-receiving member 26. In order to assemble the member 26 operatively with the chuck 1, the member 26 which is tapered slightly upon its outer face, is inserted into the tapered bore 5 of the head 3 of the chuck 1. When the member 26 enters the bore 5, the member 26 will ride along the beveled recess 19 in the detent 16, forcing the detent 16 laterally, it being recalled that the detent 16 is thrust toward the axis of the structure by the action of the spring 22. When the detent 16 is alined with the circumscribing groove 45 which is fashioned in the outer face of the member 26, the detent will enter this groove, under the action of the spring 22, the drill-receiving member 26 being thus held in the head 3 against longitudinal movement. At the same time, the projection 33 upon the ring 31 which is secured to the member 26 by the screw 32, will enter the recess 7 in the lower end of the head 3 of the chuck 1. The drill-receiving member 26 will thus be held in the chuck 1 for rotation therewith. When the chuck 1 is rotated, motion will be transmitted from the head 3 of the chuck through the medium of the interlocking elements 33 and 7 into the ring 31 and by way of the screw 32 into the drill-receiving member 26 and from the drill-receiving member 26 into the nut 34 and from the nut 34 into the shank 26 of the drill-holder 37, the drill-holder 37 through the medium of its head 38 rotating the drill 42. Should the drill 42 become lodged in the work against rotation, the screw 32 will be sheared away. Thereupon the ring 31 will rotate independently of the member 26, the ring being held to the head 3 of the chuck 1 through the coöperation of the interlocking elements 33 and 7.

It will be observed that it is not necessary to stop the rotation of the chuck 1 in order to assemble the drill 42 operatively therewith, the member 26 being merely thrust into the bore 5 until the detent 16 registers in the groove 45, and until the projection 33 of the ring 31 registers in the recess 7 of the head 3 of the chuck 1. It is equally unnecessary to stop the rotation of the chuck 1 when it is desired to remove the drill 42 from the chuck. In order to accomplish the result last above mentioned, the collar 23 is seized manually and held against rotation, it being recalled that the collar 23 and the sleeve 10 rotate as one piece. When the collar 23 and the sleeve 10 are thus held, the end walls 15 of the slot 14 in the sleeve 10 will ride along the edge 18 of the detent 16, thrusting the detent 16 transversely of the axis of the structure and withdrawing the edge 18 of the detent from its engagement with the groove 45 in the member 26, whereupon the member 26 of the drill 42 will drop out of the head 3 of the chuck 1. A slight rotation of the collar 23 and the detent will aline the walls 15 of the slot 14 with the walls 9 of the slot 8, so that the edge 18 of the detent 16 may, under the actuation of the spring 22 enter within the contour of the bore 5 of the head 3 of the chuck 1. As will be understood readily, the walls 9 and 15 of the slots 8 and 14, respectively, constitute abutments which prevent the detent 16 from being thrust too far into the bore 5 of the head 3 due to the action of the spring 22.

Having thus described the invention, what is claimed is:—

1. A device of the class described comprising as constituent parts a chuck having a bore and a drill-receiving member mounted in the bore; a single movable structure mounted directly upon the drill receiving member and forming a continuation of the bore of the chuck; interengaging elements upon the movable structure and upon one of said constituent parts to connect the movable structure and said part for simultaneous rotation; and frangible means connecting the movable structure with the other of said constituent parts for simultaneous rotation.

2. A device of the class described comprising a chuck; a drill-receiving member; a peripherally exposed part interposed operatively between the drill-receiving member and the chuck; interengaging elements upon said part and the chuck adapted to secure a rotation of said part when the chuck is rotated; and frangible means inserted radially into said part and connecting said part with the drill-receiving member independently of the chuck for rotation.

3. A device of the class described comprising a chuck and a ring, one of which is provided with a terminal recess, the other of which is provided with a projection adapted to register in the recess; a drill-receiving member inserted into and bearing upon the ring; and a releasable element connecting the ring with the drill-receiving member independently of the chuck.

4. A device of the class described comprising a tubular drill-receiving member; a drill-holding member mounted to slide longitudinally in the drill-receiving member and held against rotation therein; and spring means for advancing the drill-holding member.

5. A device of the class described comprising a tubular drill-receiving member provided with an internal shoulder; a drill-holding member mounted to slide longitudinally in the drill-receiving member and held against rotation therein; and spring means engaging the drill-holding member to maintain the same normally in abutment with the shoulder.

6. A device of the class described comprising a tubular drill-receiving member provided with an axial chamber and with a reduced drill-receiving bore, there being a shoulder at the juncture of the chamber and the bore; a drill-holding member mounted to slide longitudinally in the axial chamber and comprising an enlarged head substantially filling the chamber and adapted to abut against the shoulder; a movable abutment mounted in the drill-receiving member, in which abutment the drill-holding member is mounted to slide; and a spring engaged at one end by the abutment and at the other end by the head to advance the head toward the shoulder.

7. A device of the class described comprising a chuck; a drill-receiving member therein; means for connecting the drill-receiving member and the chuck for rotation; a detent movable transversely of the chuck and engaging the drill-receiving member against longitudinal movement; a member rotatable upon the chuck and adapted to be held against rotation when the chuck rotates; and interengaging elements upon the rotatable member and upon the detent for moving the detent away from the drill-receiving member when the rotatable member is held and when the chuck rotates.

8. A device of the class described comprising a chuck; a drill-receiving member therein; means for connecting the drill-receiving member and the chuck for rotation, a detent movable transversely of the chuck and engaging the drill-receiving member against longitudinal movement; a member rotatable upon the chuck and adapted to be held against rotation when the chuck rotates; and interengaging elements upon the rotatable member and upon the detent for moving the detent away from the drill-receiving member when the rotatable member is held and when the chuck rotates; and spring means for advancing the detent toward the drill-receiving member.

9. A device of the class described comprising a chuck and a member rotatable thereon, the chuck and said member being provided with alinable openings; a detent slidable in the openings and protruding into the chuck, the detent being engageable by the rotatable member to withdraw the detent when the rotatable member is rotated upon the chuck; and a drill-receiving member mounted within the chuck and having a projection engageable by the detent to hold the drill-receiving member against longitudinal movement; and means for connecting the drill-receiving member and the chuck for simultaneous rotation.

10. A device of the class described comprising a chuck and a member rotatable thereon, the chuck and said member being provided with alinable openings; a detent slidable in the openings and protruding into the chuck, the detent being engageable by the rotatable member to withdraw the detent when the rotatable member is rotated upon the chuck; and a drill-receiving member mounted within the chuck and having a projection engageable by the detent to hold the drill-receiving member against longitudinal movement; means for connecting the drill-receiving member and the chuck for simultaneous rotation; and spring means for advancing the detent into the chuck when the openings are alined.

11. A device of the class described comprising a chuck and a sleeve rotatable upon the chuck, the sleeve and the chuck being provided with alinable openings; a detent movable in the openings and adapted to protrude into the chuck, the sleeve being adapted to engage the detent to withdraw the same from the chuck; a collar engaged about the sleeve; and a spring interposed between the collar and the detent and adapted to advance the detent into the chuck.

12. A device of the class described comprising a chuck and a rotatable member thereon provided with alinable openings; a detent mounted to slide in the openings transversely of the chuck and adapted to protrude into the chuck, the rotatable member being arranged to engage the detent to withdraw the same from the chuck; means for maintaining the detent in the openings; and a spring interposed between the said means and the detent and adapted to advance the detent into the chuck.

13. A device of the class described comprising as constituent parts a chuck and a drill-receiving member; a movable structure; interengaging elements upon the movable structure and upon one of said constituent parts to connect the movable structure and said part for simultaneous rotation; frangible means connecting the movable structure with the other of said constituent parts for simultaneous rotation; and a drill-holding member mounted to slide longitudinally in the drill-receiving member and held against rotation therein.

In testimony that I claim the foregoing as my own, I have hereto affixed my signature in the presence of two witnesses.

ROBERT G. McDOWELL.

Witnesses:
  W. D. KYLE,
  H. C. HAYNES.

Copies of this patent may be obtained for five cents each, by addressing the "Commissioner of Patents, Washington, D. C."